(12) United States Patent
Matsui (10) Patent No.: US 10,685,238 B2
(45) Date of Patent: Jun. 16, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Taichi Matsui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 15/409,993

(22) Filed: Jan. 19, 2017

(65) Prior Publication Data
US 2017/0220873 A1 Aug. 3, 2017

(30) Foreign Application Priority Data
Jan. 29, 2016 (JP) .................... 2016-016175

(51) Int. Cl.
*G06K 9/00* (2006.01)
*G06K 9/32* (2006.01)

(52) U.S. Cl.
CPC ..... *G06K 9/00778* (2013.01); *G06K 9/00744* (2013.01); *G06K 9/3233* (2013.01); *G06K 2209/21* (2013.01)

(58) Field of Classification Search
None
See application file for complete search history.

(56) References Cited

U.S. PATENT DOCUMENTS

| 5,684,714 | A | * | 11/1997 | Yogeshwar | .......... G11B 27/031 370/521 |
| 6,292,217 | B1 | * | 9/2001 | Uehara | .............. H04N 1/00291 348/207.99 |
| 6,829,006 | B1 | * | 12/2004 | Hayashi | ............... H04N 1/2112 348/231.2 |
| 2005/0018926 | A1 | * | 1/2005 | Momose | ................. G06T 11/60 382/284 |
| 2010/0156931 | A1 | * | 6/2010 | Boreham | ................ G06T 11/60 345/621 |
| 2012/0274780 | A1 | * | 11/2012 | Yamamoto | ......... H04N 5/23229 348/169 |

(Continued)

FOREIGN PATENT DOCUMENTS

JP 2010-140425 A 6/2010
JP 2015062052 A 4/2015

OTHER PUBLICATIONS

Joseph Redmon, Santosh Divvala, Ross Girshick, Ali Farhadi, "You Only Look Once: Unified, Real-Time Object Detection", arXiv: 1506.02640v4 [cs.CV] Nov. 12, 2015. (Year: 2015).*

(Continued)

*Primary Examiner* — Jiangeng Sun
(74) *Attorney, Agent, or Firm* — Carter, DeLuca & Farrell LLP (57) ABSTRACT

An image processing apparatus sets a first detection area as a detection area for detecting a predetermined object in a first image, modifies the first detection area based on a size of the first image and a size of the second image different from the size of the first image to set a second detection area as the detection area in the second image, and detects the predetermined object in the second detection area.

15 Claims, 5 Drawing Sheets

(56) References Cited

U.S. PATENT DOCUMENTS

| | | | |
|---|---|---|---|
| 2013/0108175 A1* | 5/2013 | Ptucha | G06T 11/60 |
| | | | 382/199 |
| 2015/0228045 A1* | 8/2015 | Mehta | G06T 1/0064 |
| | | | 382/103 |

OTHER PUBLICATIONS

Notice of Reasons for Refusal issued by the Japanese Patent Office dated Nov. 15, 2019 in corresponding Japanese Patent Application No. 2016-016175, with English translation.

\* cited by examiner

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

In recent years, an image processing apparatus capable of performing a detection of people or the like in an image is used in various situations. Such an image processing apparatus is used in order to measure a number of spectators in a stadium or to measure a number of visitors of an amusement park for example. A targeted detection area may be a whole image or may be a portion of an image when the image processing apparatus detects the number of people or the like in an image. Accordingly, in an image processing apparatus, it is necessary to set a detection area in each image when detecting people or the like in a plurality of images, a video, or the like. For example, in Japanese Patent Laid-Open No. 2010-140425, a method in which a local area is set for subsequent frames based on a search result in an initial frame is disclosed as a method for setting a detection area in each image.

An image processing technique for easily and appropriately setting a size of a detection area in accordance with an image size in relation to a plurality of images of differing image sizes was necessary.

SUMMARY OF THE INVENTION

According to one aspect of the present invention, there is provided an image processing apparatus, which comprises: a setting unit configured to set a first detection area as a detection area for detecting a predetermined object in a first image; a modification unit configured to modify the first detection area based on a size of the first image and a size of the second image different from the size of the first image to set a second detection area as the detection area in the second image; and a detection unit configured to detect the predetermined object in the second detection area.

Further features of the present invention will become apparent from the following description of exemplary embodiments (with reference to the attached drawings).

DESCRIPTION OF THE EMBODIMENTS

Below, with reference to the attached drawings, a detailed description is given for the present invention based on an embodiment. Note that configurations illustrated in the following embodiments are merely examples, and the present invention is not limited to the illustrated configurations.

Figure 1:
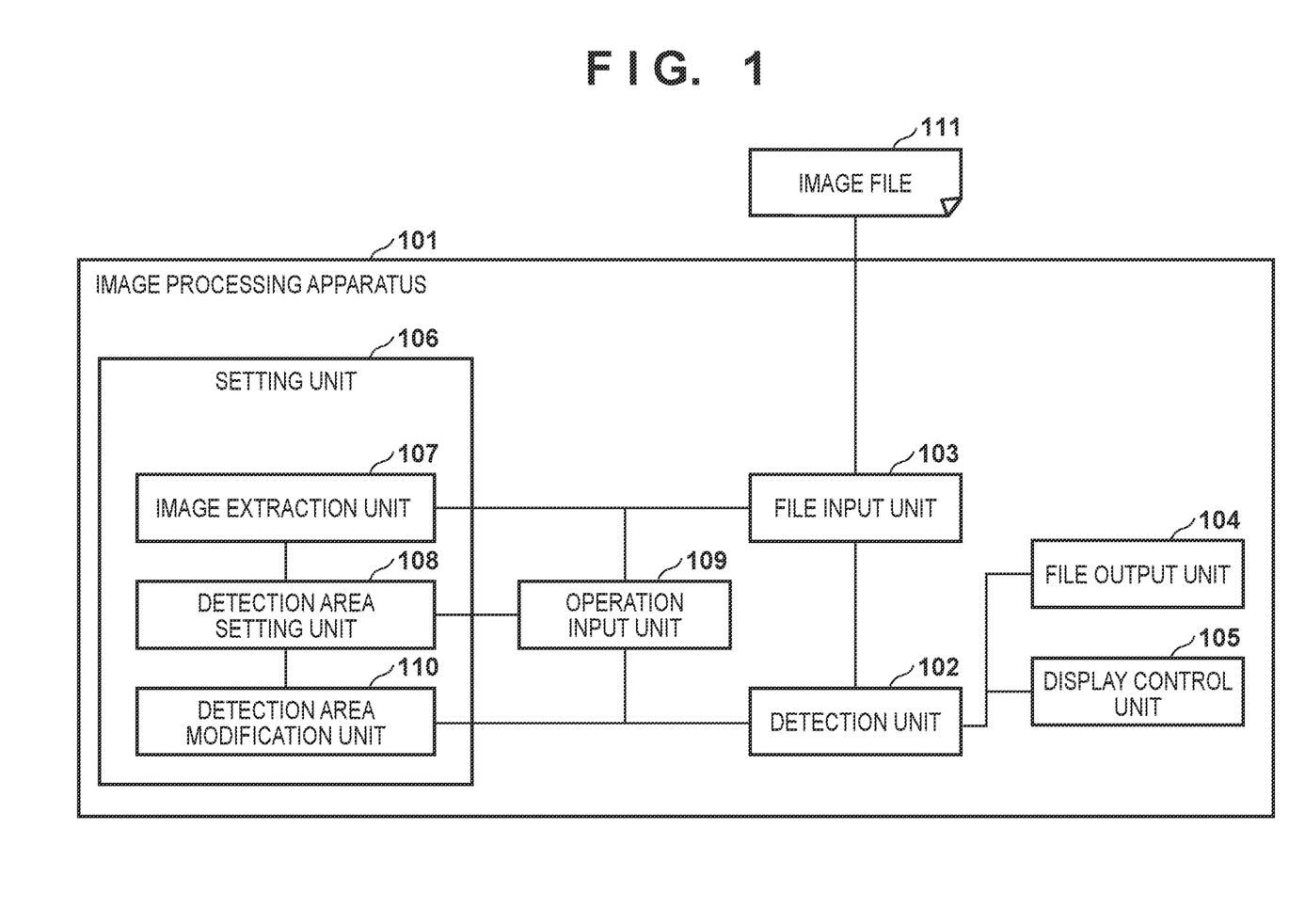
FIG. 1 illustrates an example of a configuration of an image processing apparatus.

FIG. 1 illustrates an example configuration of an image processing apparatus according to embodiments of the present invention. An image processing apparatus 101 has a detection unit 102, a file input unit 103, a file output unit 104, a display control unit 105, a setting unit 106, and, an operation input unit 109. The setting unit 106 has an image extraction unit 107, a detection area setting unit 108, and a detection area modification unit 110.

Figure 2:
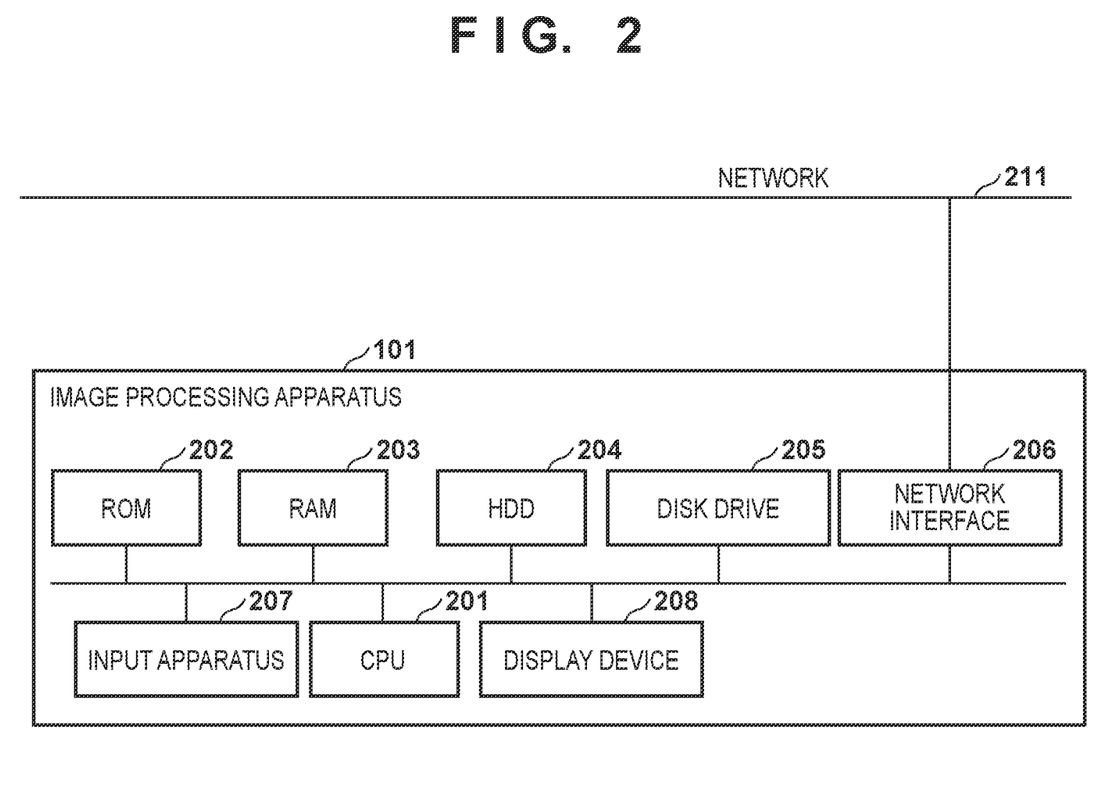
FIG. 2 illustrates an example of a hardware configuration of the image processing apparatus.

The detection unit 102 performs detection of predetermined targets such as people (objects). The file input unit 103 inputs an image file 111. The file output unit 104 outputs a result file as a result of a detection by the detection unit 102. The display control unit 105 performs various displays to a display device 208 (FIG. 2). The setting unit 106 performs detection area setting processing. Specifically, the image extraction unit 107 extracts, from the image file 111 inputted by the file input unit, an image (target image) made to be a target of the setting of the detection area. The operation input unit 109 inputs operation information of an input apparatus 207 by a user (FIG. 2). The detection area setting unit 108 sets the detection area in the target image in accordance with the operation information. The detection area modification unit 110 performs processing for modification of the detection area.

FIG. 2 illustrates an example of a hardware configuration of the image processing apparatus 101. The image processing apparatus 101 has a CPU 201, a ROM 202, a RAM 203, a hard disk drive (HDD) 204, a disk drive 205, a network interface 206, the input apparatus 207, and the display device 208. The network interface 206 is connected to a network 211. The CPU 201 is a control apparatus controlling the image processing apparatus 101 overall. The ROM 202 stores programs for the CPU 201 to control the image processing apparatus 101. Specifically, a program stored in the ROM 202 realizes functions of FIG. 1 and processing of the flowchart illustrated in FIG. 5 described later. A secondary storage apparatus may also be provided in place of the ROM 202. The RAM 203 loads a program that the CPU 201 reads from the ROM 202 and is a memory for executing processing. Also, the RAM 203 is used as a storage area for temporarily storing data that is a target of various processing as a temporary storage memory.

The following embodiment is a method of inputting an image file. As one embodiment, the HDD 204 is capable of storing the image file 111 and the CPU 201 inputs the image file 111 from the HDD 204. Note, the HDD 204 is not necessary in a case when the CPU 201 inputs the image file 111 from the disk drive 205 or the network interface 206.

Also, as a separate embodiment, the disk drive 205 reads the image file 111 from a CD, a DVD, a blue ray disk, or a flexible disk, and the CPU 201 inputs the image file 111 via the disk drive 205. Note, the disk drive 205 is not necessary in a case when the CPU 201 inputs the image file 111 from the HDD 204 or the network interface 206.

Also, as an yet another embodiment, the CPU 201 inputs the image file 111 via the network 211. The network interface 206 is not necessary in a case when the CPU 201 inputs the image file 111 from the HDD 204 or the disk drive 205.

Note, configuration may also be taken such that the method of inputting an image file is a combination of any of the above described embodiments.

The display device 208 is a device such as a display. The input apparatus 207 has a keyboard for numeric value input and a pointing device, mouse, touch panel, and the like for instructing a display position of the display area of the display device 208.

As described above, the hardware configuration of the image processing apparatus 101 has hardware configuration elements similar to hardware configuration elements mounted to a generic PC (personal computer). For that reason, various realized functions in the image processing apparatus 101 can be implemented as software which operates on a PC. The image processing apparatus 101 can realize the functions of FIG. 1 and the processing of the flowchart illustrated in FIG. 5 described later by the CPU 201 executing a program.

Next, description will be given regarding processing of the image processing apparatus 101 according to this embodiment with reference to FIG. 3 to FIG. 5. First, description will be given regarding FIG. 3 and FIG. 4 which are examples of screens displayed on the display device 208.

Figure 3:
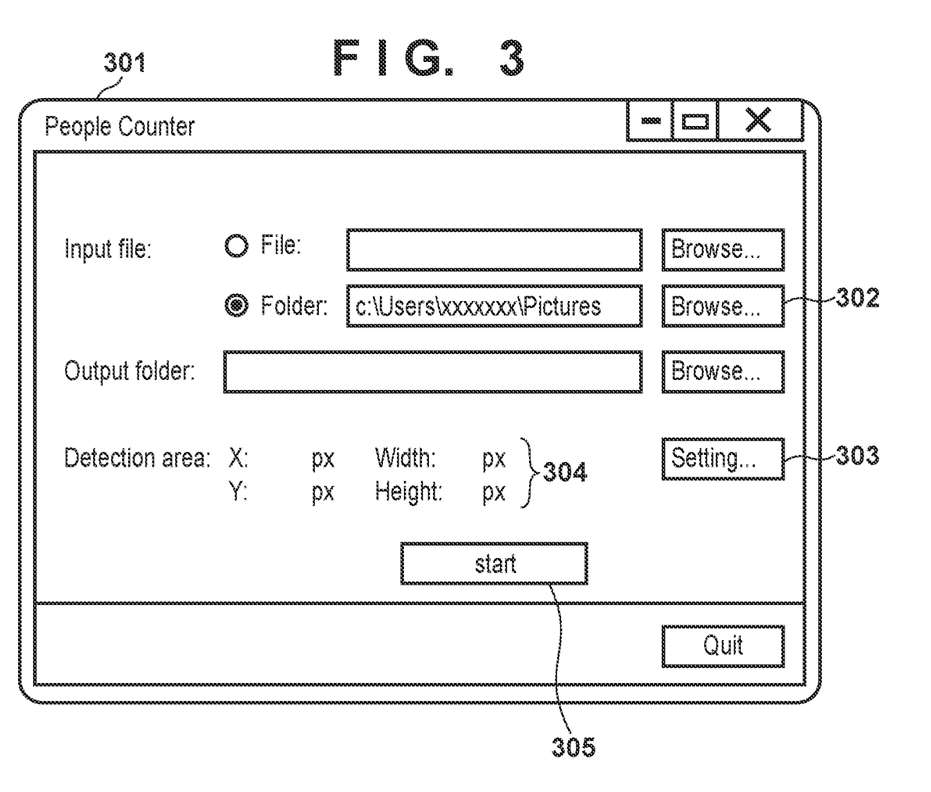
FIG. 3 illustrates an example of a main window of the image processing apparatus.

FIG. 3 illustrates one example of a main window 301 that the display control unit 105 displays on the display device 208. The main window 301 has an input folder selection button 302, a detection area setting window activation button 303, a detection area display area 304, and a detection start button 305.

Figure 4:
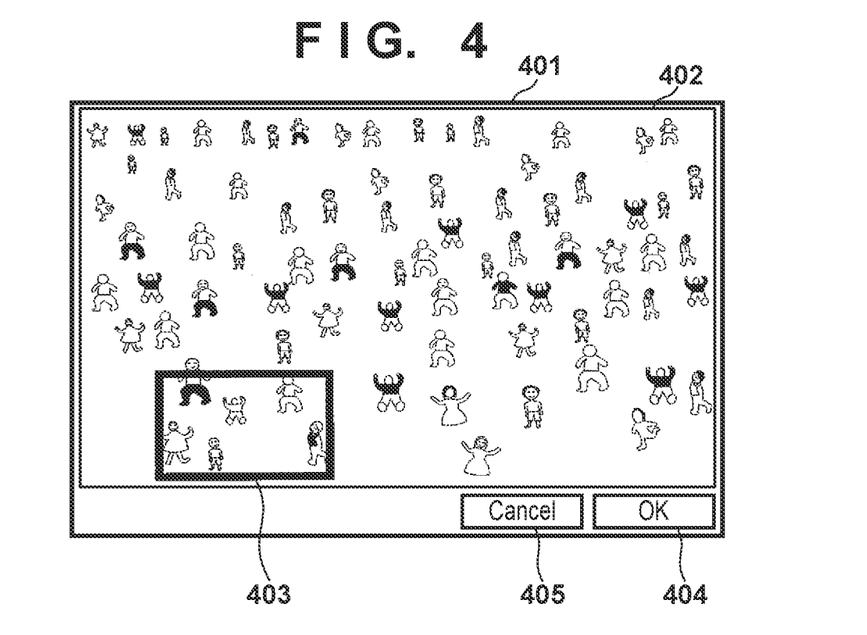
FIG. 4 illustrates one example of a detection area setting window.

FIG. 4 illustrates one example of a detection area setting window 401 that the display control unit 105 displays on the display device 208. In a detection area setting window 401, a target image 402, a detection area 403, an OK button 404, and a cancel button 405 are displayed.

Note, the main window 301 of FIG. 3 and the detection area setting window of FIG. 4 are capable of displaying on the display device 208 at the same time.

Figure 5:
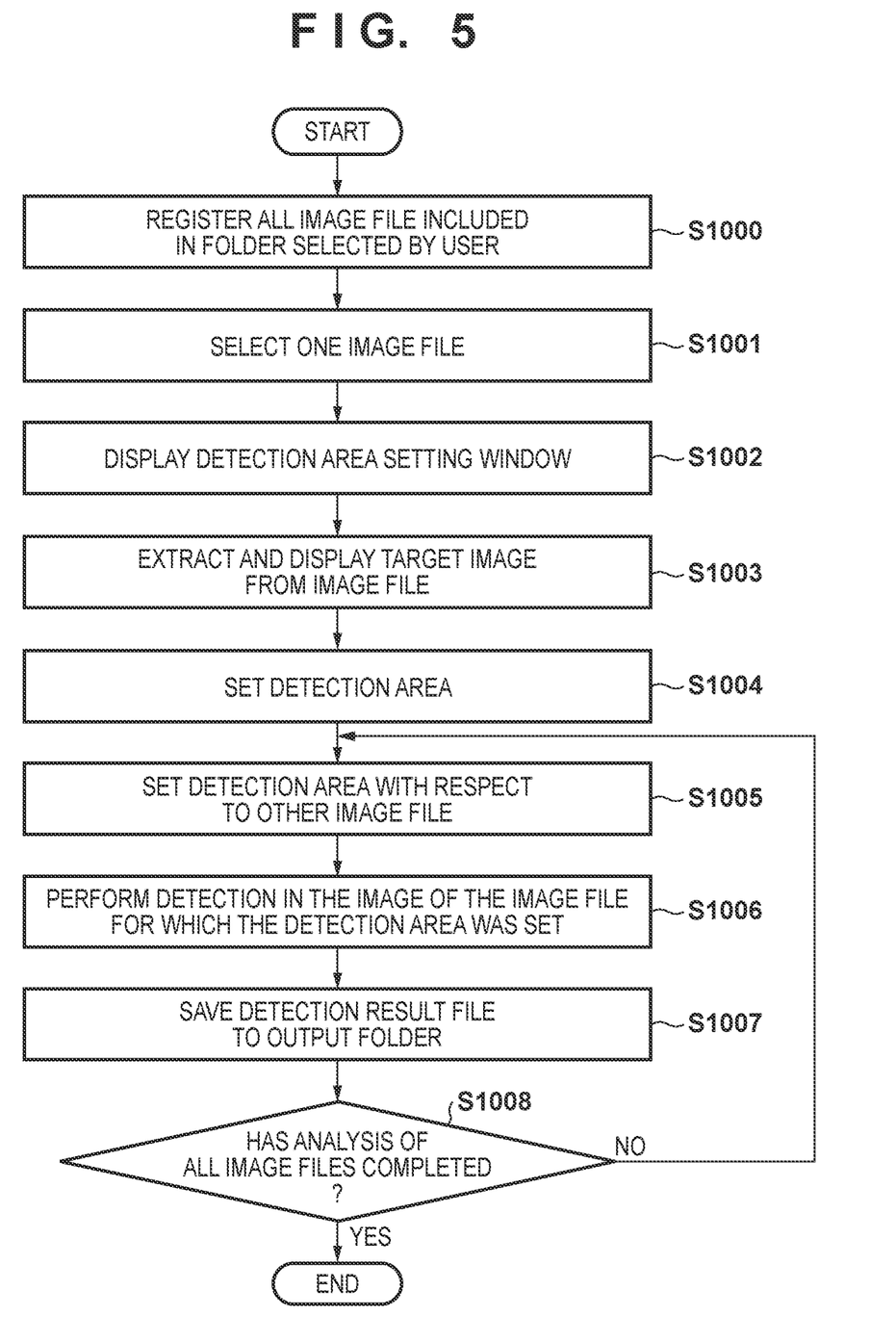
FIG. 5 is a flowchart illustrating one example of a process of the image processing apparatus according to this embodiment.

Next, description is given regarding processing of the image processing apparatus 101 using FIG. 5 with reference to FIG. 3 and FIG. 4. FIG. 5 is a flowchart illustrating one example of processing of the image processing apparatus 101. The display control unit 105 firstly displays the main window 301 of FIG. 3 to the display device 208 when the image processing apparatus 101 activates. In step S1000, processing which registers all image files included in a folder selected by a user on the main window 301 as targets for analysis is performed.

Specifically, the display control unit 105 firstly displays a folder selection dialog on the display screen of the display device 208 when a selection of the input folder selection button 302 by the user is detected. A folder selection dialog, although not shown in FIG. 3, is a window on which a list of folders that the user can select are displayed. Note, the input folder selection button 302 and the folder selection dialog are one example of the file input unit 103. When the user selects one folder in the folder selection dialog, the file input unit 103 registers all image files included in the selected folder as targets for analysis. Note, a method of registration of a plurality of files registered as targets for analysis is not limited to this method and may be another method. Also, a type of image file that is registered may be either of a still image file and a video file. A still image file includes at least one image and a video file is configured from images of a plurality of frames.

Next, in step S1001, the file input unit 103 selects a particular image file among a plurality of registered image files (image file 111) based on a predetermined condition. The file input unit 103 inputs the selected image file 111 to the image processing apparatus 101 via the HDD 204, the disk drive 205, or the network interface 206. Here, although the predetermined condition is a condition by which the file which is positioned at the head is selected first in a case when file names are sorted, for example, it may also be another condition.

Next, in step S1002, the display control unit 105 displays the detection area setting window 401 of FIG. 4 onto the display screen of the display device 208 in accordance with a selection of the detection area setting window activation button 303 by the user. The detection area setting window 401 is a window which has the function of the detection area setting unit 108.

Next, in step S1003, the image extraction unit 107 extracts from the image file 111 a target image as an image targeted for setting the detection area, and the display control unit 105 displays it onto the display screen as the target image 402. A method of extraction of a target image will be described below. The image extraction unit 107 extracts one image from the image file 111 as an extracted image in a case in which the image file 111 is a still image file including only one image. The image extraction unit 107 extracts an image of a head frame of the image file (video file) 111 as the target image in a case when the image file 111 is a video file configured from images of a plurality of frames.

Next, in step S1004, the detection area setting unit 108 sets a size and position of the detection area 403 in accordance with a frame operation on the target image 402 by the user. The operation input unit 109 inputs operation information of the input apparatus 207 input by the user and the detection area setting unit 108 sets the detection area 403 in accordance with that operation information.

One example of a method of setting the detection area 403 will be described below. Here, the input apparatus 207 is a mouse. The target image 402 of FIG. 4 is of a rectangular shape. The rectangular detection area 403 is displayed on the target image 402. The user drags the mouse on the target image 402 in order to draw the detection area 403 on the target image 402. A point that a user performs a mouse-down on the target image 402 becomes one vertex, a point that the user performs a mouse-up on the target image 402 becomes another vertex, and the two vertices are paired vertices. When parallel lines extend on each side of the target image 402 from the two vertices, two intersection points can be found. A rectangle joining the above four points is the detection area 403. The display control unit 105 displays the detection area 403 on the target image 402 in accordance with a user operation.

Next, the detection area setting unit 108 closes the detection area setting window 401 and sets the XY coordinates of the vertex of the top-left of the detection area 403 and a width and a height as the detection area when a selection of the OK button 404 by the user is detected. The display control unit 105 displays the XY coordinates of the top-left vertex, the width, and the height of the detection area 403 on the detection area display area 304. Note that here, although a vertex of the top-left of the detection area 403 is used, one of the other three points may be used. In this way, the detection area setting unit 108 sets the detection area 403 on the target image 402.

The detection area setting unit 108 closes the detection area setting window 401 and does not set the detection area of a new XY coordinate or the like when a selection of the cancel button 405 by the user is detected.

Note, a method for setting the detection area 403 is not limited to the above described method. Any of a variety of methods may be used such as a method of setting according to dragging or the like of a frame prepared in advance or a method of causing a parallel translation of the edges of the frame for example. Also, a shape of the detection area 403 may be a shape other than a rectangle and may be a shape of a closed space in which the detection unit 102 can detect people or the like.

Next, in step S1005, the detection area modification unit 110 performs a modification of the detection area with respect to an image file (specifically, an image file registered in step S1000) of the targets for analysis in accordance with a selection of the detection start button 305 by the user. Hereinafter, description is given of an example of a method for modification of a detection area. Note, an image size of an image of a video and the like included in one image file is fixed, and an image size of an image included in another image file is assumed to be different.

[First Detection Area Modification Method]

Figure 6:
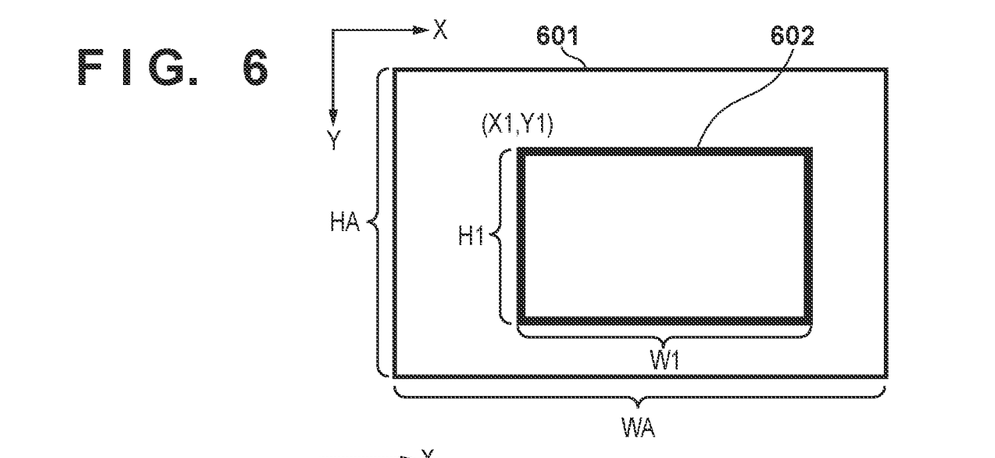
FIG. 6 illustrates one example of an image and a detection area.

Description is given of a method in which the detection area set in an image of an image file A is modified, and then setting of the detection area in an image of an image file B is performed as a method for modification of the first detection area. In FIG. 6, an image 601 in the image file A and a detection area 602 set in step S1004 on the image 601 are illustrated. Here, the width of the image 601 is WA and the height is HA. Also, the coordinates of the detection area 602 are (X1, Y1), the width is W1, and the height is H1. Note, in FIGS. 6 and 7, the top-left of images 601 and 701 are origin points.

Figure 7:
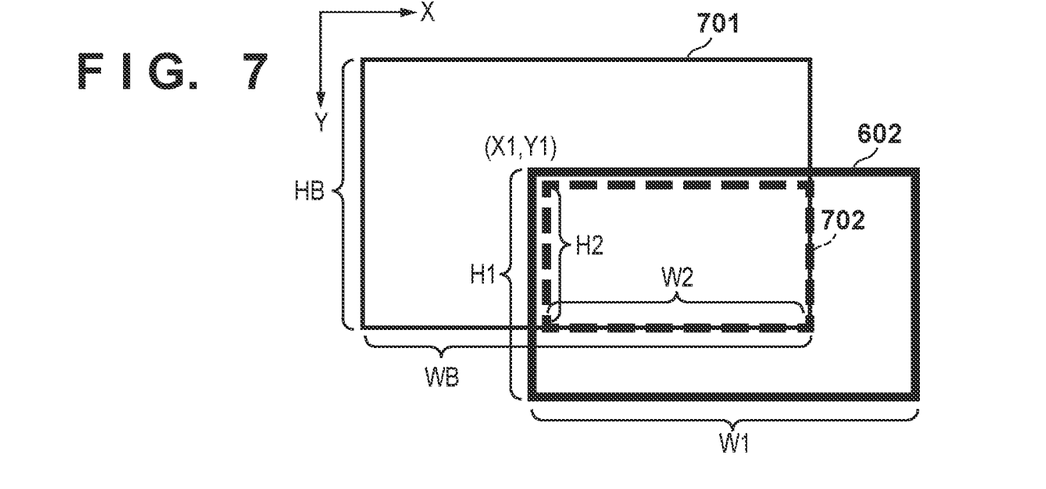
FIG. 7 illustrates one example of an image and a detection area before modification and after modification.

The image file B is an image file registered in step S1000 and is an image file in which a setting of a detection area is not yet finished. FIG. 7 illustrates an image 701 of the image file B. Here, a width of the image 701 is WB and a height is HB, and a size of the image 701 is assumed to be smaller than the image 601. Coordinates of the detection area 602 before modification are (X1, Y1), the width is W1, and the height is H1, and coordinates of a detection area 702 after modification are (X1, Y1), the width is W2, and the height is H2.

The following relationship expressions are used in this method for modification.

$$WB < X1 + W1 \quad (1)$$

$$HB < Y1 + H1 \quad (2)$$

W2=WB−X1 and the width of the detection area which is modified when the condition of (1) is satisfied.

W2=W1 and the width of the detection area is unchanged when the condition of (1) is not satisfied.

H2=HB−Y1 and the height of the detection area is modified when the condition of (2) is satisfied.

H2=H1 and the height of the detection area is unchanged when the condition of (2) is not satisfied.

For FIG. 7, the conditions (1) and (2) are satisfied. Accordingly, the new detection area after modification has the coordinates (X1, Y1), a width of W2, and a height of H2. The new detection area is the detection area of the image 701 of the image file B. The new detection area is saved in the setting unit 106.

The first detection area modification method, in other words, includes the following processing by the detection area modification unit 110. Specifically, the detection area modification unit 110 sets, as the detection area 702, an area modified such that a portion of the detection area 602 that sticks out from the image 701 is cropped from the detection area 602 in the case of arrangement in which the image 601 (target image) in which the detection area 602 (the detection area set in step S1004) is arranged and the image 701 are superimposed aligning predetermined vertices thereof. The image of the image file B corresponds to the top-left portion of the image of the image file A and may be an image captured by a camera at an angle of view which partially overlaps the image of the image file A. Note that in FIG. 7, although the predetermined vertices are the top-left of the images, limitation is not made to this.

[Second Detection Area Method for Modification]

A method in which a detection area set in an image of an image file A is modified and a detection area in an image of an image file C which is smaller than the size of the image of the image file A is set is described as a second detection area modification method. The image of the image file C is assumed to be an image captured by a camera at the same angle of view as the image of the image file A. FIG. 6 illustrates the image of the image file A and description is the same as above. Note, the top-left of an image 801 (the image 601, although not shown) is assumed to be the origin point in FIG. 8 as well.

Figure 8:
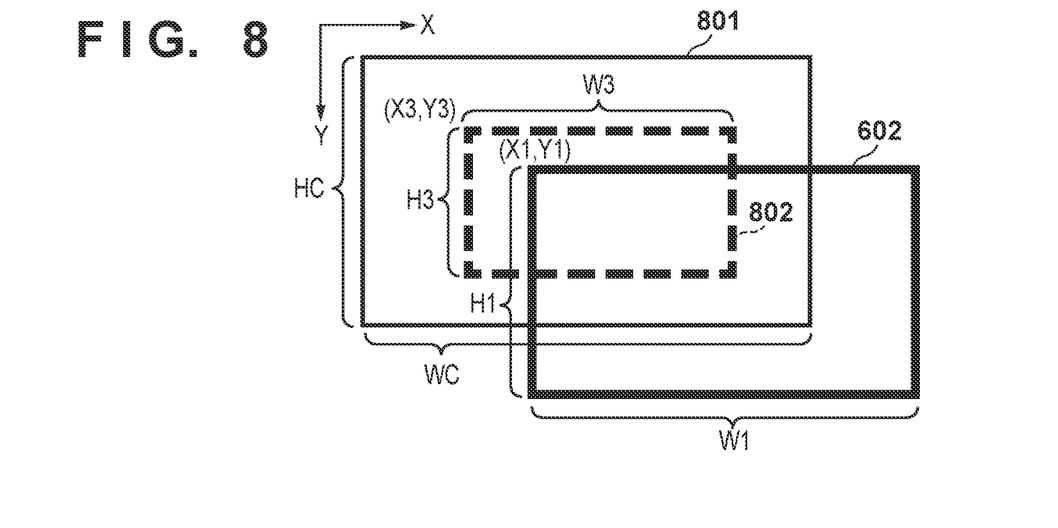
FIG. 8 illustrates a different example of an image and detection area before modification and after modification.

The image file C is an image file registered in step S1000 and is an image file in which a setting of a detection area is not yet finished. FIG. 8 illustrates the image 801 of the image file C. Here, the width of the image 801 is WC and the height is HC. Coordinates of the detection area 602 before modification are (X1, Y1), the width is W1, and the height is H1, and coordinates of a detection area 802 after modification are (X3, Y3), the width is W3, and the height is H3.

In this method for modification, each value after modification, as follows, is a ratio of the width of the image 601 of the image file A and the width of the image 801 of the image file C, or a ratio of the height of the image 601 of the image file A and the height of the image 801 of the image file C.

$$X3 = X1 \times WC/WA$$

$$Y3 = Y1 \times HC/HA$$

$$W3 = W1 \times WC/WA$$

$$H3 = H1 \times HC/HA$$

By this, the new detection area after modification has the coordinates (X3, Y3), a width of W3, and a height of H3. The new detection area is the detection area of the image 801 of the image file C. The new detection area is saved in the setting unit 106.

The second detection area modification method, in other words, includes the following processing by the detection area modification unit 110. Specifically, the detection area modification unit 110 sets as the detection area 802 the area obtained by modifying the detection area 602 such that a relationship of a position and a size of the detection area 602 in relation to the image 601 (target image) is the same in the image 801. Specifically, this method for modification can be applied in a case when an angle of view of the image 601 and an angle of view of the image 801 are the same.

Returning to FIG. 5, next, in step S1006, the detection unit 102 performs detection of people (objects) in the image of the image file for which the detection area was set. The area that the detection unit 102 detected is the interior of a rectangle defined by an X coordinate, a Y coordinate, a width, and a height saved in the setting unit 106. In the present embodiment, although the targets to be detected are people (objects), other targets may be included if it is something else that can be detected from the image. For example, the targets may be characters or symbols or the like. The detection unit 102 performs detection on a plurality of images in a case in which the image file is a video file configured from images of a plurality of frames.

In the present embodiment, although the images of the image file that the detection unit 102 detects are assumed to be all images included in the image file, it is not necessary that it be all of the images. For example, the detection target of the detection unit 102 may be any image if it is an image within the image file such as an image of a predetermined play back time interval, an image of a predetermined frame interval, a predetermined image, an end image, or a head image within the image file.

Next in step S1007, the file output unit 104 outputs a result file as a result of a detection of people (objects) by the detection unit 102. Specifically, the file output unit 104 saves the result file to a predetermined output folder. Included in the result file is a list, described in which as metadata is a number detected for each image of a detection target, and images in which a mark is added for the detected people (objects), for example.

One example of a result file is illustrated below. The file output unit 104 generates, as a file, a still image on which a number of targets such as people or the like that were detected in a frame image of a detection target is superimposed. In a case when the image file is a still image, only one file is outputted. In a case when the image file is a video, one file is outputted every one second of the video.

The file name is <image file name>_000000.jpg in a case of a still image. The image file name is sample_000000.jpg in a case of "sample.jpg". Meanwhile, in a case of a video, the file name differs by frame rate (fps), a first frame is made to be <image file name>_000000.jpg, and a value for which the frame rate number is added to the frames processed in a one second interval is entered into the file name. The start frame is data_000000.jpg when the image file name is "data.avi" and subsequent frames are as in the following example.

In a case of 30 fps: data_000000.jpg, data_000030.jpg, data_000060.jpg . . .

In a case of 5 fps: data_000000.jpg, data_000005.jpg, data_000010.jpg . . .

Next, in step S1008, it is determined whether analysis of all image files targeted for analysis selected in step S1000 has completed. If the result of the determination is that there is an incomplete image file (if NO in step S1008), the image processing apparatus 101 makes that image file the target, returns processing to step S1005, and performs the same processing. In step S1008, if analysis of all files has completed (if YES in step S1008), the processing finishes.

In this way, by virtue of the present embodiment, it is possible to modify and apply a detection area set in a single image to an appropriate detection area in accordance with an image size in relation to another image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Note, the foregoing embodiments merely illustrate embodying examples of implementing the present invention, and the technical scope of the present invention should not be interpreted to be limited thereby. In other words, the present invention can be implemented in various forms without deviating from the technical concepts or the main features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-016175, filed Jan. 29, 2016, which is hereby incorporated by reference herein in its entirety.

What is claimed is:

1. An image processing apparatus, comprising:
a processor; and
a memory storing instructions which, when executed by the processor, cause the image processing apparatus to:
select a first image file from a plurality of image files which are included in a folder, in response to a user instruction for designating the folder;
cause a display unit to display a first captured image, wherein data of the first captured image is included in the first image file;
set a first detection area for detecting a predetermined object in the first captured image, according to designation by a user; and
set a second detection area for detecting the predetermined object in a second captured image, based on a position of the first detection area in the first captured image, a size of the first captured image and a size of the second captured image different from the size of the first captured image, wherein data of the second captured image is included in a second image file which is included in the folder and is different from the first image file.

2. The image processing apparatus according to claim 1, wherein the second detection area corresponds to an area where the first detection area and an area of the second captured image overlap in the case of arrangement in which the first captured image in which the first detection area is arranged and the second captured image are superimposed aligning predetermined vertices.

3. The image processing apparatus according to claim 1, wherein in setting the second detection area, the instructions, when executed by the processor, cause the image processing apparatus to set, as the second detection area, an area obtained by modifying the first detection area such that a relationship of a position and a size of the first detection area in relation to the first captured image is the same in the second captured image.

4. The image processing apparatus according to claim 1, wherein the first image file includes at least the data of the first captured image and the second image file includes at least the data of the second captured image, the first captured image and the second captured image being captured by a camera at partially or a same angle of view.

5. The image processing apparatus according to claim 1, wherein at least one of the first image file or the second image file satisfies at least one of: the first image file includes data of a plurality of captured images including the first captured image or the second image file includes data of a plurality of images including the second captured image.

6. The image processing apparatus according to claim 1, wherein the instructions, when executed by the processor, further cause the image processing apparatus to output information indicating a result of detecting the predetermined object in the first detection area in the first captured image and information indicating a result of detecting the predetermined object in the second detection area in the second captured image.

7. The image processing apparatus according to claim 6, wherein
in a case where the second image file includes data of a plurality of images including the second captured image:
the outputting includes outputting a result of detecting the predetermined object in the second detection area in relation to the plurality of images.

8. The image processing apparatus according to claim 6, wherein the instructions, when executed by the processor, further cause the image processing apparatus to make a file name of the result be a file name that includes a number for which a video frame rate number is added in order.

9. The image processing apparatus according to claim 1, wherein the predetermined object includes one of a person, an object, a symbol, or a character.

10. An image processing method, comprising:
selecting a first image file from a plurality of image files which are included in a folder, in response to a user instruction for designating the folder;
causing a display unit to display a first captured image, wherein data of the first captured image is included in the first image file;
setting a first detection area for detecting a predetermined object, in the first captured image according to designation by a user; and
setting a second detection area for detecting the predetermined object in a second captured image, based on a position of the first detection area in the first captured image, a size of the first captured image and a size of the second captured image different from the size of the first captured image, wherein data of the second captured image is included in a second image file which is included in the folder and is different from the first image file.

11. A non-transitory computer readable medium storing a computer-executable program for causing a computer to perform an image processing method, the method comprising:
selecting a first image file from a plurality of image files which are included in a folder, in response to a user instruction for designating the folder;
causing a display unit to display a first captured image, wherein data of the first captured image is included in the first image file;
setting a first detection area for detecting a predetermined object in the first captured image, according to designation by a user; and
setting a second detection area for detecting the predetermined object in a second captured image, based on a position of the first detection area in the first captured image, a size of the first captured image and a size of the second captured image different from the size of the first captured image, wherein data of the second captured image is included in a second image file which is included in the folder and is different from the first image file.

12. The image processing method according to claim 10, wherein the second detection area corresponds to an area where the first detection area and an area of the second captured image overlap in the case of arrangement in which the first captured image in which the first detection area is arranged and the second captured image are superimposed aligning predetermined vertices.

13. The non-transitory computer readable medium according to claim 11, wherein the second detection area corresponds to an area where the first detection area and an area of the second captured image overlap in the case of arrangement in which the first captured image in which the first detection area is arranged and the second captured image are superimposed aligning predetermined vertices.

14. The image processing apparatus according to claim 1, wherein the instructions, when executed by the processor, further cause the image processing apparatus to detect the predetermined object in the first detection area in the first captured image and detect the predetermined object in the second detection area in the second captured image.

15. The image processing apparatus according to claim 1, wherein a file which is positioned at a head is selected as the first captured image in a case where file names of the plurality of image files are sorted.

* * * * *